United States Patent [19]

Hordijk et al.

[11] Patent Number: 5,344,316

[45] Date of Patent: Sep. 6, 1994

[54] MOVEMENT SIMULATOR

[75] Inventors: Jan Hordijk, Hoofddorp; Gerhard J. Wierda, Lisserbroek, both of Netherlands

[73] Assignee: Fokker Aircraft B.V., Schiphol, Netherlands

[21] Appl. No.: 145,322

[22] Filed: Oct. 28, 1993

[30] Foreign Application Priority Data

Oct. 30, 1992 [NL] Netherlands ............... 9201896

[51] Int. Cl.$^5$ ............................................. G09B 9/00
[52] U.S. Cl. ............................................. 434/37; 434/58
[58] Field of Search ............... 434/29, 37, 55, 58–61; 340/407; 472/1, 29–31, 35, 130

[56] References Cited

U.S. PATENT DOCUMENTS

| | | | |
|---|---|---|---|
| 3,597,857 | 8/1971 | Ahister et al. | 434/58 |
| 4,559,014 | 12/1985 | Campbell | 434/58 |
| 4,576,577 | 3/1986 | Lam et al. | 434/58 |
| 5,176,518 | 1/1993 | Mordijk et al. | 434/37 |

Primary Examiner—Robert Bahr
Assistant Examiner—Glenn E. Richman
Attorney, Agent, or Firm—Webb Ziesenheim Bruening Logsdon Orkin & Hanson

[57] ABSTRACT

The present invention relates to a movement simulator having a support frame and a subframe movable relative to the support frame and connected by a variable element. A simple control assembly is electrically connected to the variable element for controlling its length. The transducer assembly having at least one acceleration transducer attached to the variable element supplies an acceleration signal of a subframe relative to the support frame to the control assembly. The invention includes circuitry to avoid non-defined senarios in determining the acceleration signal.

5 Claims, 5 Drawing Sheets

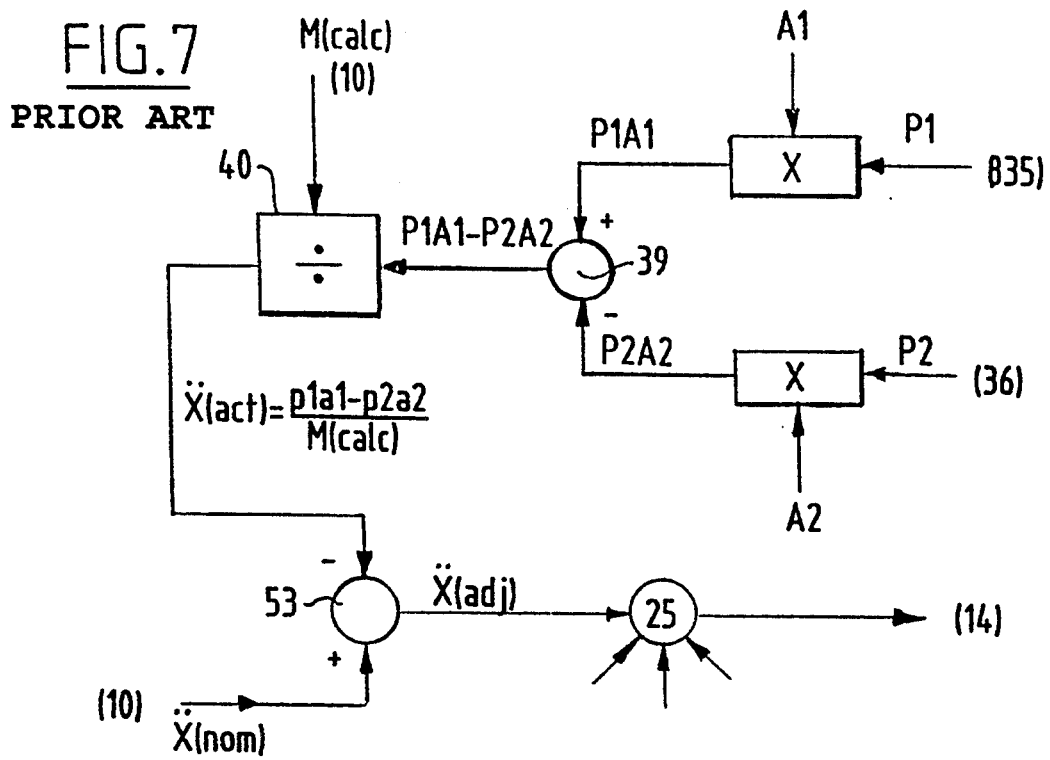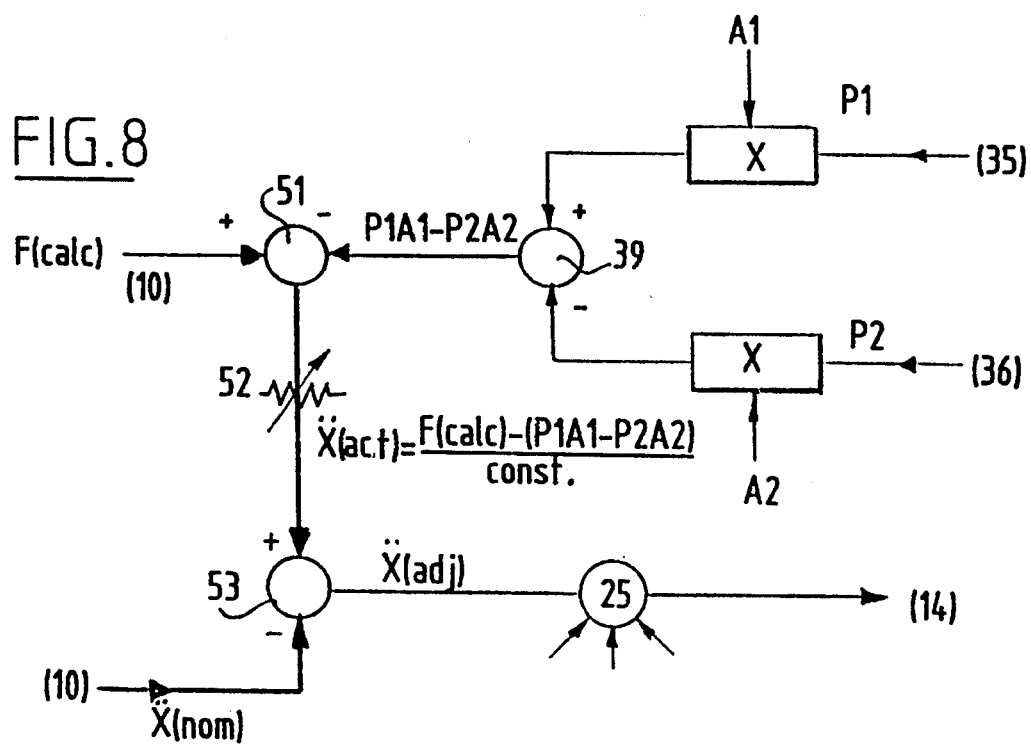

MOVEMENT SIMULATOR

BACKGROUND OF THE INVENTION

1. Field of the Invention

The present invention relates to a movement simulator such as, for example, flight simulators, truck movement simulators, ship movement simulators, tank movement simulators and the like.

2. Background Information

Movement simulators are well-known in the art such as, for example, illustrated in European Patent Application No. EP-A-0 446 786 and U.S. Pat. No. 5,176,518 of the applicants. These patent applications disclose a flight simulator by means of which a user is subjected to the play of forces that occur in actual flight conditions. In this prior art the nominal accelerations are compared to a measured acceleration. The measured acceleration is calculated by multiplying the measured pressure differences in the two compartments of a hydraulic cylinder by the associated piston surface areas, subtracting this measured force from one another and dividing the obtained difference by an effective mass which is calculated by the computer. Difficulties from this system arise when the calculated effective mass is zero, thereby resulting in a non-defined situation which cannot be effectively handled by the simulator. The present invention overcomes the afore-mentioned difficulties of the prior art.

BACKGROUND OF THE INVENTION

SUMMARY OF THE INVENTION

The invention relates to a movement simulator comprising:
  a frame to be disposed fixedly and placed for instance on the ground;
  an auxiliary frame movable relative to that frame, for instance for carrying a control assembly and a seat for a user;
  at least one hydraulic or pneumatic cylinder which is coupled to the frame and supports the auxiliary frame, in which cylinder a piston is arranged for sliding sealingly, which piston divides the cylinder into two compartments;
  a central control unit connected to the or each cylinder for controlling the length thereof; and
  a sensor assembly for at least one parameter representative of the mechanical situation of the variable element, which sensor assembly supplies its output signals representative of the actual value of the relevant parameter to the central control unit for comparing thereof to the momentary nominal value of the relevant parameter and adjusting of the variable element until the actual value and the nominal value of the parameter are substantially the same as each other;
  which sensor assembly comprises an acceleration sensor which generates an acceleration signal representative of the acceleration of the end of the hydraulic or pneumatic cylinder connected to the auxiliary frame, which acceleration sensor comprises:
    two pressure sensors which generate pressure signals representative of the pressures prevailing in the two respective compartments;
    multiplying means for multiplying the pressure signals by the respective effective piston surface areas for generating respective force signals;
    first subtracting means which subtract these force signals from one another for generating an effective force signal;
    means for deriving an actual acceleration signal partly from this effective force signal;
    second subtracting means which subtract this actual acceleration signal and a nominal acceleration signal from one another to form an adjusting acceleration signal (partly) on the basis of which the cylinder is controlled.

The movement simulator according to the present invention is not limited to flight simulators but also embraces other applications wherein it is the desire to impose force, acceleration, speed and/or position on a movable auxiliary frame with great accuracy. A movement simulator can for instance also simulate the movements of tanks, trucks, ships or the like.

The above described European patent application EP-A-0 446 786, which is incorporated herein by way of reference, relates to a movement simulator which makes use of one or more hydraulic cylinders which are controlled such that a desired acceleration prescribed by a central control unit is followed as precisely as possible under different loads, that is, masses, on the hydraulic cylinders. For this purpose according to this prior art the nominal acceleration is compared to a measured acceleration. The measured acceleration was calculated by multiplying the measured pressure differences in the two compartments of the hydraulic cylinder by the associated piston surface areas, subtracting the thus measured forces from one another and dividing the obtained difference by a mass calculated by the computer.

It has been found that conditions can occur in which it is possible for the calculated masses to obtain a negative value. Mathematically and physically this does indeed appear to be correct. Acceleration and force can in some conditions possess an opposite sign.

Resulting however from the transition from a positive to a negative mass and vice versa is a non-defined situation which can be designated mathematically as "dividing by zero" in the calculation of the acceleration.

The present invention has for its object to resolve this problem and provides to this end a movement simulator of the described type having the feature that the acceleration circuit further comprises
  a third subtracting circuit which subtracts the effective force signal and an estimated force signal from one another to form an actual force signal; and
  adjustable amplifying means for amplifying this actual force signal with a desired factor, the output signal of which amplifying means is the actual acceleration signal.

The difference between the present invention and the said prior art is that the computer calculates an estimated force instead of an estimated mass. This estimated force is compared to the measured force which is determined in the manner already described from the measured pressure differences. The desired acceleration generated by the computer is corrected with the difference between the measured force and the calculated force. The simulator according to the invention therefore makes use as it were of a force loop which is controlled by the estimated force.

The invention will now be elucidated with reference to the annexed drawing. Reference is also made to the older European patent application EP-A-0 446 786 of applicant, in which are stated per se known further special features of movement simulators of the present type.

BRIEF DESCRIPTION OF THE DRAWINGS

In the drawing:

FIG. 7 shows a circuit which forms part of the control system according to FIG. 6; and FIG. 8 shows a view corresponding with FIG. 7 of a circuit according to the present invention.

DESCRIPTION OF THE PREFERRED EMBODIMENT

Figure 1:
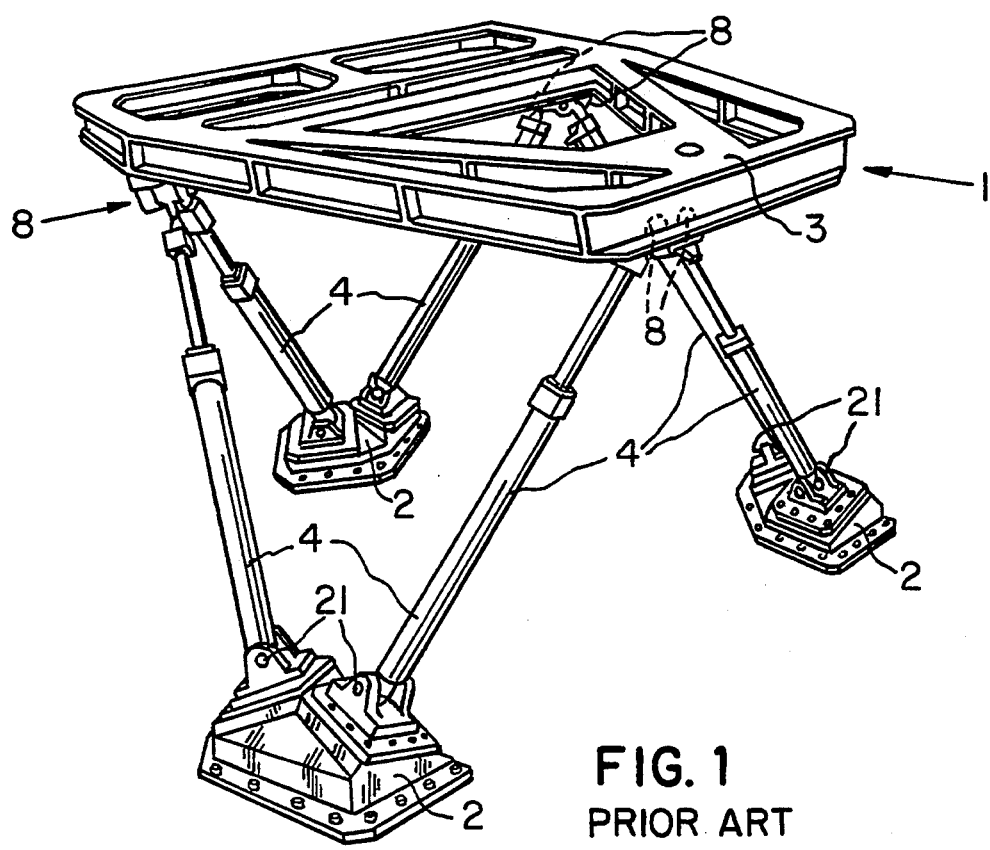
FIG. 1 shows a schematic perspective view of a movement simulator according to EP-A-0 446 786.

FIG. 1 shows a movement simulator. This comprises a frame 2 placed on the ground and an auxiliary frame 3 which is movable relative to this frame 2 and onto which can be fixed for instance a cockpit with seat for a user. Auxiliary frame 3 is movably supported by the frame 2 by means of six hydraulic cylinders which for the sake of convenience are all designated with 4. The hydraulic cylinders 4 are connected to a central control unit (not drawn) and a hydraulic system with which the length of the hydraulic cylinders 4 can be varied as desired, for instance under program control from a computer.

Figure 2:
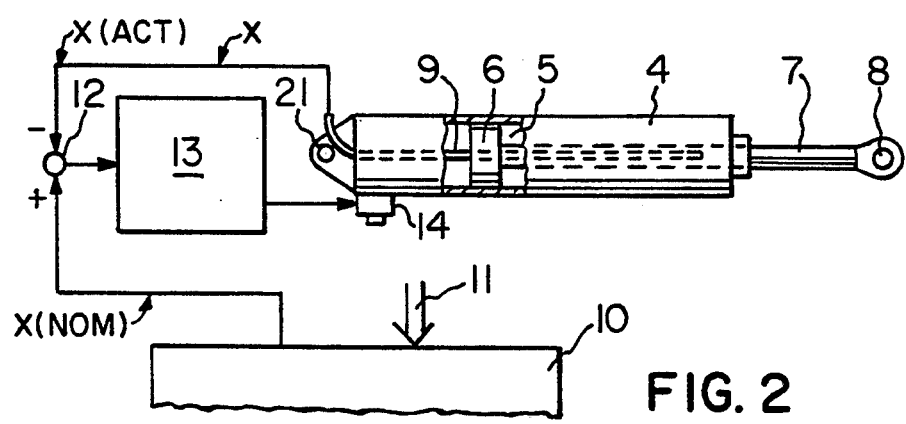
FIG. 2 is a highly simplified control diagram according to this prior art.

FIG. 2 shows the control system in which a hydraulic cylinder 4 is incorporated. Hydraulic cylinder 4 comprises a cylinder housing 5 and a piston rod 7 joined to a piston 6. The change in length of the hydraulic cylinder 4 is defined as the difference in position between cylinder housing 5 and piston rod 7, for example the end 8 thereof hingedly connected to auxiliary frame 3. A linear position sensor 9 generates a position signal x. As position sensor can be used a linear variable differential transformer, or LVDT. With greater deflections an LVDT is however no longer fully linear. In that case a "temposonic" sensor or other fully linear sensor can preferably be applied.

The position signal x corresponds with the measured or actual position and is from now on therefore designated x(act).

A computer 10 calculates a desired or nominal position on the basis of input data 11, data present in a memory and the control program entered beforehand into the computer. In FIG. 2 the relevant output signal of the computer is designated with x(nom). A difference circuit 12 determines the difference between x(nom) and x(act) and feeds the difference signal to a control unit 13 which feeds a control signal to a control valve 14 which regulates the feed and drain of oil under pressure to and from hydraulic cylinder 4. At a fixed x(nom) a negative feedback action is thus performed by the described control system whereby the difference between x(nom) and x(act) is gradually eliminated until both positions are the same as one another.

Figure 3:
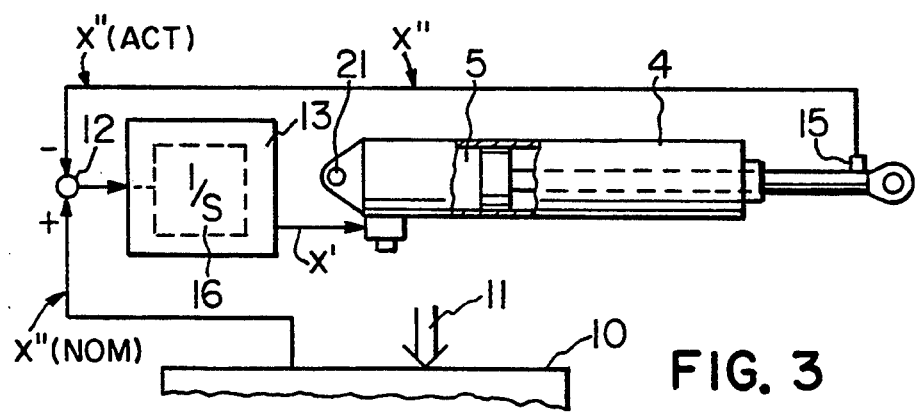
FIG. 3 is a diagram corresponding with FIG. 2 of a control system according to this prior art.

FIG. 3 shows a similar diagram as FIG. 2, wherein however use is made of an acceleration sensor 15 which generates an acceleration signal x″. This corresponds with the measured or actual acceleration. In this respect, as in FIG. 2, the designations x″(act) and x″(nom) are therefore also used. The designation x″ represents a double differentiation of the position to time. The designation x′, which will follow hereinbelow, represents a single differentiation of the position to time.

As shown in FIG. 3 with broken lines, the control unit 13 comprises an integrator 16 designated with 1/s. The signal for supplying to the control valve then no longer corresponds in this case to an acceleration but to a speed and is therefore designated x′.

Figure 4:
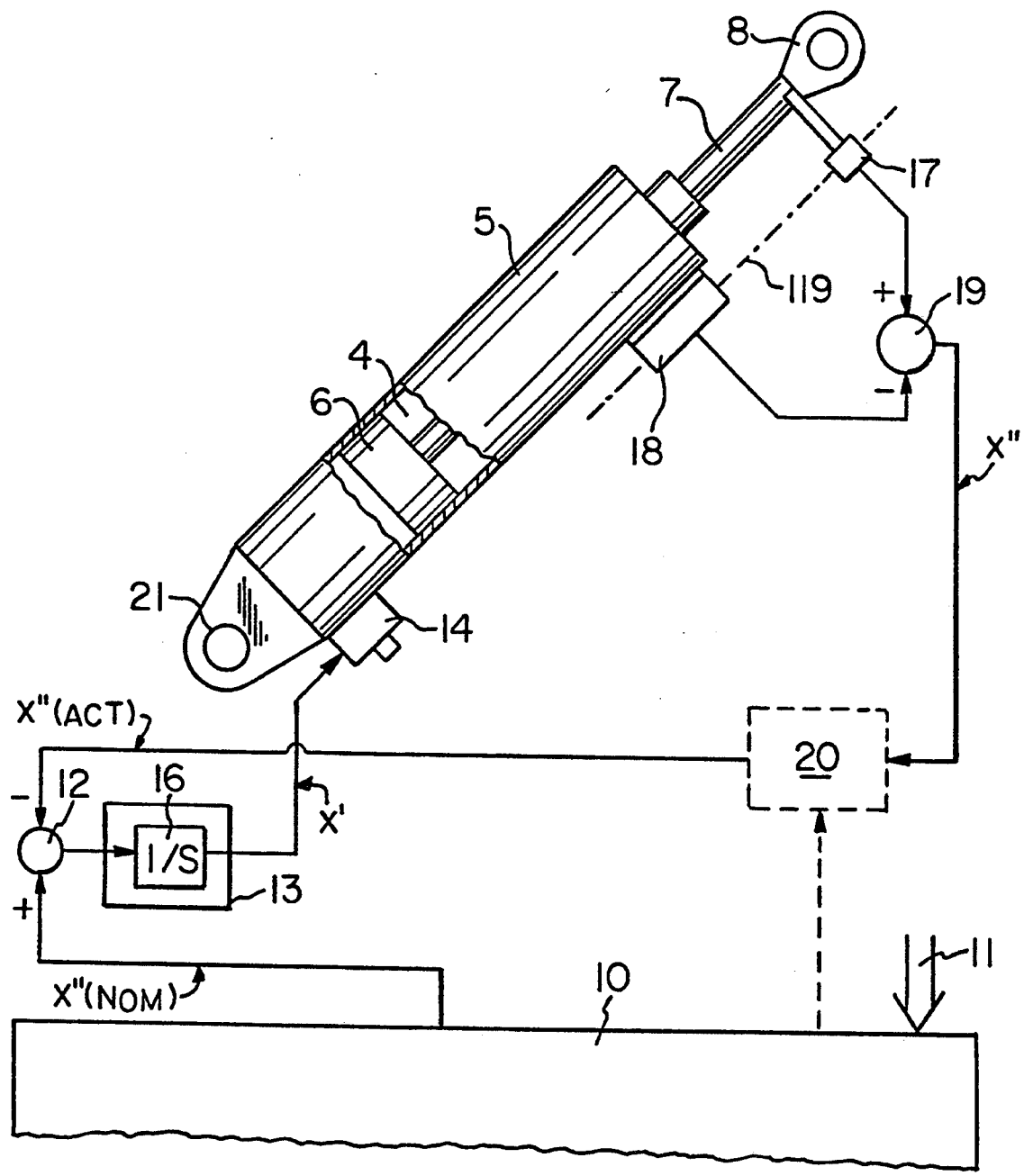
FIG. 4 shows a control system in a further embodiment according to this prior art.

FIG. 4 shows an embodiment in which the acceleration sensor 15 is replaced by two acceleration sensors 17, 18 which are arranged respectively on the piston rod 7 and the cylinder housing 5. As indicated with a dash-dot line 19, acceleration sensors 17, 18 are placed precisely in line with each other. The output signals of the sensors 17, 18 are fed to a difference circuit 19, the output signal of which is supplied as x(act) to the inverting input of difference circuit 12. Indicated with dashed lines is a correcting circuit 20 which is controlled by the computer 10 and serves to compensate the difference in centrifugal accelerations of the sensors 17 and 18 which in any case have different arms relative to the pivot point 21 with the frame 2.

Figure 5:
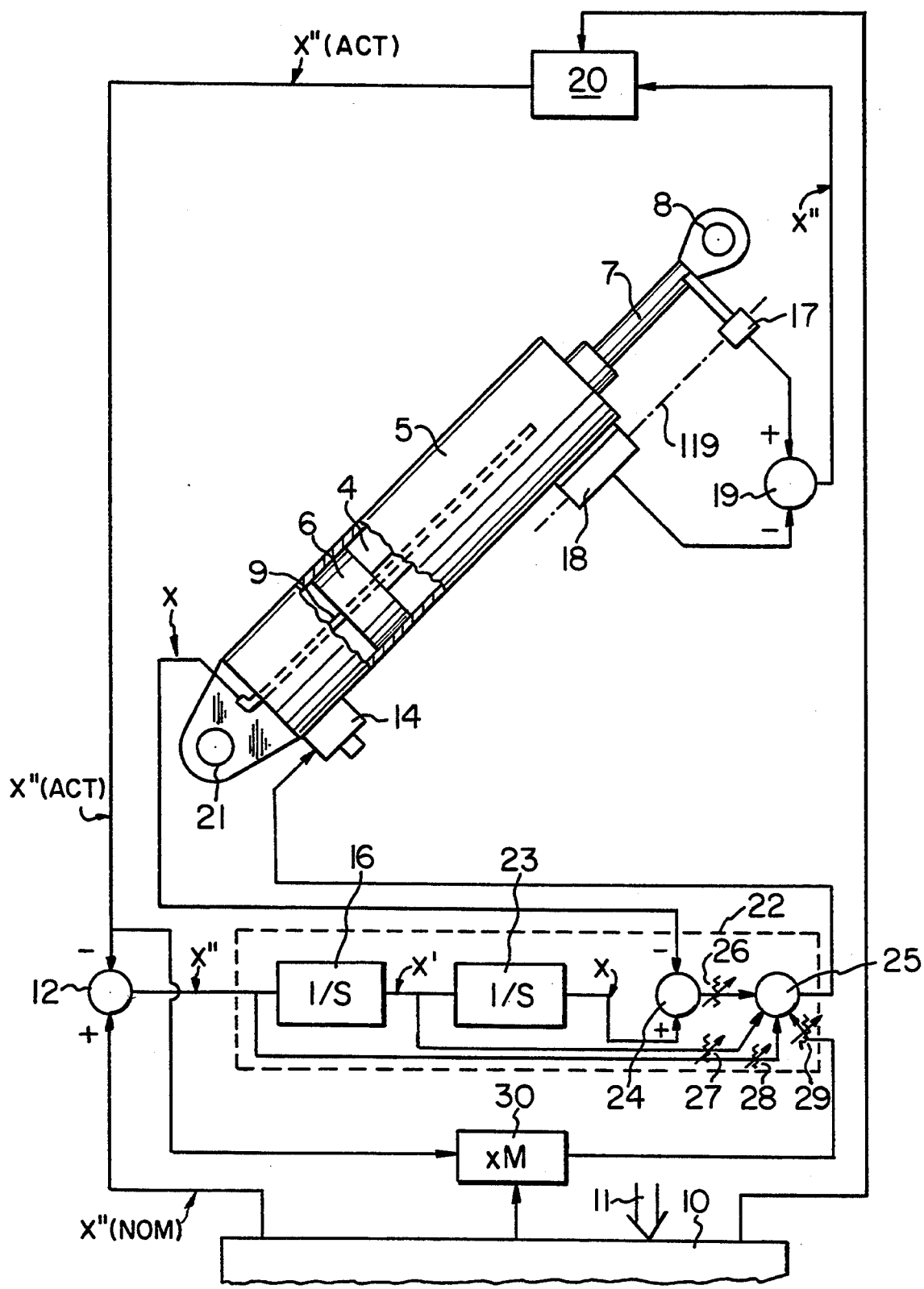
FIG. 5 shows a control system in a further embodiment according to this prior art.

FIG. 5 shows an embodiment wherein use is made for a great part of the same control system as shown in FIG. 4.

The embodiment of FIG. 5 comprises however a control unit 22 which is depicted with a broken line border and comprises the first integrator 16, a second integrator 23, a difference circuit 24 and an adder circuit 25. The output signal x′ from the first integrator 16 is fed to the second integrator 23. The output signal x thereof is fed to the non-inverting input of the difference circuit 24. Supplied to the inverting input thereof is the output signal x from the position sensor 9. The output signal from the difference circuit 24 is fed as position error signal via a controllable attenuator 26 to the adder circuit 25. The output signal x′ from the first integrator 16 is fed as speed signal via an attenuator 27 to the adder circuit 25. The output signal x″ of the difference circuit 12 is fed as acceleration signal via an adjustable attenuator 28 to the adder circuit 25.

The output signal x(act) of the correcting circuit 20 is also fed to a multiplier 30 which multiplies the relevant acceleration signal by a value of the actual effective mass calculated by the computer 10 and feeds the relevant product signal, therefore a force signal, via an attenuator 29 to the adder circuit 25.

The output circuit of this adder circuit 25 is fed as control signal to the control valve 14.

It is noted that the hydraulic system providing the energy for displacement of piston 6 of hydraulic cylinders 4 is not drawn in the figures. This is however generally known art.

Figure 6:
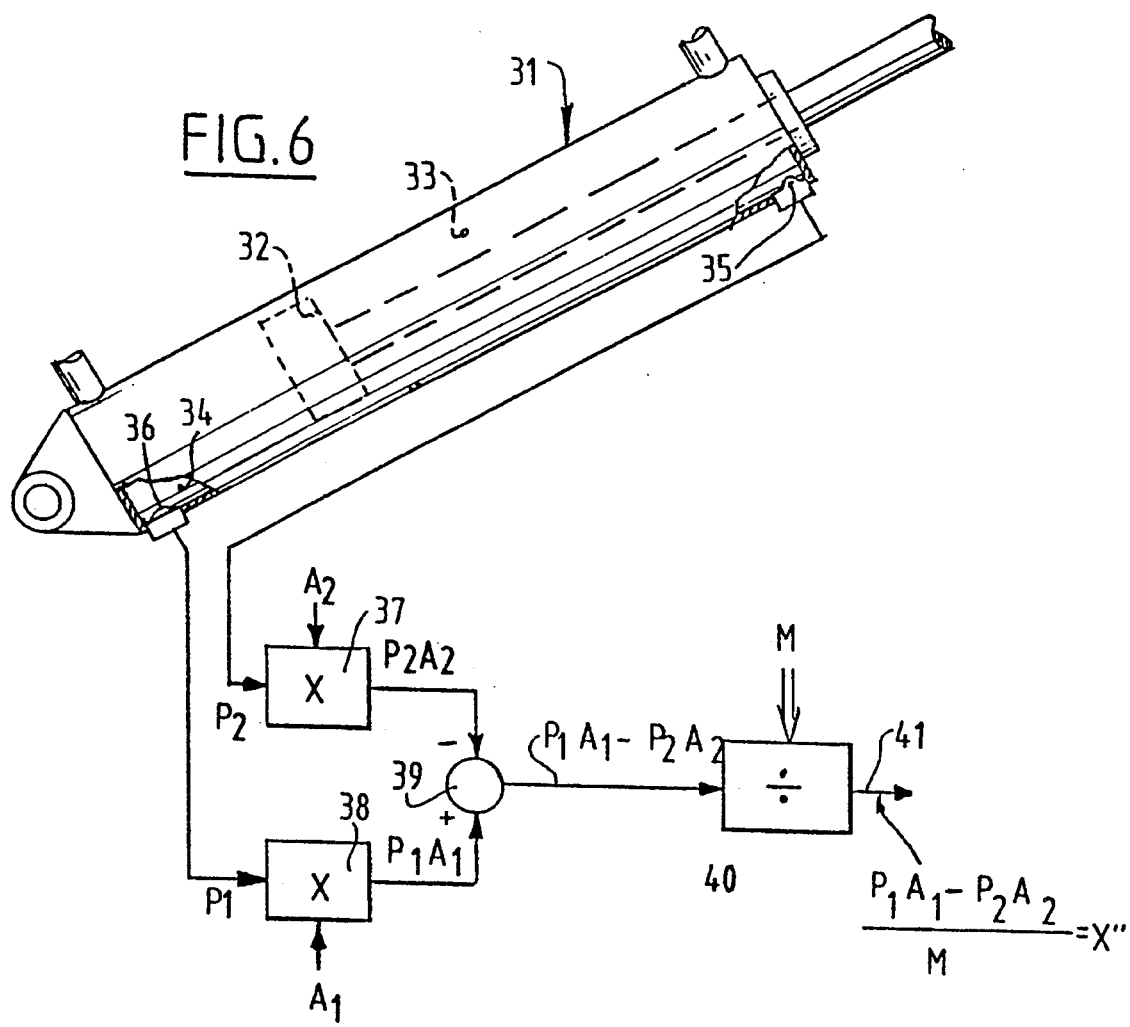
FIG. 6 shows a control system in a further embodiment according to this prior art.

FIG. 6 shows schematically a hydraulic cylinder 31 in which the piston 32 divides the cylinder into two compartments 33, 34 respectively. Placed in these respective compartments 33, 34 are associated pressure sensors 35, 36 which generate pressure signals P1, P2 which are representative of the hydraulic pressures prevailing in the respective compartments 33, 34. These pressure signals are fed to respective multiplying means 37, 38 in which they are multiplied by A1 and A2 which represent respectively the effective piston surface areas on the sides of the respective compartments 33, 34. The output signals of the multipliers 37, 38 are subtracted from each other in a subtractor 39, the output signal of which is fed to a divider 40 which divides the output signal from the subtractor 39 by M, which is the value of the mass present on the end of the cylinder which bears the auxiliary frame. The output 41 thus provides the acceleration signal x″. This signal x″ can be further processed and used for control as described above.

Since the value M is not a constant, it can be calculated by a computer to which relevant parameters have been supplied beforehand, such as the mass distribution of the auxiliary frame, the effective rest length of the cylinder, the rest angle between the cylinder axis and the corresponding displacement of the auxiliary frame etc. The computer performs such a calculation on the basis of the momentary value of the position of the auxiliary frame for all degrees of freedom, both translation and rotation.

FIG. 7 depicts again the circuit shown in FIG. 6. For a good understanding of the invention this circuit is placed in a somewhat larger context, see also FIG. 5. It will be clear that the divider 40 divides the force signal P1A2–P2A2 by the calculated value of the mass M(calc). In particular conditions this value can acquire zero value whereby a non-defined and therefore undesirable situation results.

FIG. 8 shows a circuit according to the present invention in which this problem of the prior art is resolved.

Otherwise than in the known art, the computer 10 generates a calculated force signal F(calc) which is subtracted from the signal P1A2–P2A2. Use is made for this purpose of a subtractor 51. The output signal of this subtractor is attenuated by a controllable attenuator 52. The setting of this attenuator is such that in this way an effective division is performed by a constant that has been set once. The signal available at the output of attenuator 52 is fed to a subtractor 53 in which the desired acceleration signal x″(nom) calculated by the computer is subtracted from the resulting actual acceleration signal x″(act). Available at the output of subtractor 53 is a difference signal corresponding with the adjusting acceleration signal x″(adj) which is fed to the adder circuit 25. It should therefore be understood that the difference between the prior art as shown in FIG. 7 and the invention as shown in FIG. 8 lies in the manner in which the actual acceleration signal is formed. The invention avoids singularities which may result in undefined situations.

We claim:

1. A movement simulator comprising:
a frame to be disposed fixedly;
an auxiliary frame movable relative to said frame;
at least one cylinder which is coupled to said frame and supports said auxiliary frame, in which said cylinder a piston is arranged for sliding sealingly, which said piston divides said cylinder into two compartments;
a central control unit connected to each said cylinder for controlling the length thereof; and
a sensor assembly for at least one parameter representative of the mechanical situation of said cylinder, which said sensor assembly supplies output signals representative of an actual value of said relevant parameter to said central control unit for comparing thereof to a momentary nominal value of said relevant parameter and adjusting of said cylinder until said actual value and said nominal value of said parameter are substantially the same as each other;
which said sensor assembly comprises an acceleration sensor which generates an acceleration signal representative of the acceleration of an end of said cylinder connected to said auxiliary frame, which said acceleration sensor comprises
two pressure sensors which generate pressure signals representative of the pressures prevailing in said two respective compartments;
multiplying means for multiplying said pressure signals by a respective effective piston surface areas for generating respective force signals;
first subtracting means which subtract said force signals from one another for generating an effective force signal;
means for deriving an actual acceleration signal at least partly from said effective force signal;
second subtracting means which subtract said actual acceleration signal and a nominal acceleration signal from one another to form an adjusting acceleration signal at least on the basis of which said cylinder is controlled;
wherein said acceleration circuit further comprises
a third subtracting circuit which subtracts said effective force signal and an estimated force signal from one another to form an actual force signal; and
adjustable amplifying means for amplifying said actual force signal with a desired factor, said output signal of which amplifying means is said actual acceleration signal.

2. A movement simulator, comprising:
at least one support frame;
a subframe movable relative to said support frame;
a variable element having a first end connected to said support frame and a second end connected to said subframe, and a variable length for effecting movement of said subframe relative to said support frame;
a central control assembly electrically connected with said variable element for controlling the length thereof; and
acceleration measuring means attached to said variable element, said acceleration measuring means supplying an acceleration signal representing acceleration of said subframe relative to said support frame to said central control assembly, said acceleration measuring means comprising two pressure transducers for generating pressure signals, multiplying means for multiplying said pressure signals for generating respective force signals, a first subtracting means for subtracting said force signals for generating an effective force signal, a second subtracting means for subtracting said effective force signal from a calculated force signal, and a scaling means for scaling an output from said second subtraction means by a predetermined constant and thereby generating an acceleration signal.

3. The movement simulator of claim 2, wherein said central control assembly calculates said calculated force signal.

4. The movement simulator as defined in claim 2, wherein said variable element comprises a hydraulic cylinder.

5. The movement simulator of claim 2, wherein the acceleration measuring means comprises a first acceleration transducer attached to the second end of the variable element and a second acceleration transducer attached between said first and second ends of said variable element, said first and second acceleration transducers being aligned and producing acceleration signals.

* * * * *

UNITED STATES PATENT AND TRADEMARK OFFICE
CERTIFICATE OF CORRECTION

PATENT NO. : 5,344,316

DATED : September 6, 1994

INVENTOR(S) : Jan Hordijk and Gerhard J. Wierda

It is certified that error appears in the above-indentified patent and that said Letters Patent is hereby corrected as shown below:

Title page, item [56], References Cited, U.S. PATENT DOCUMENTS, "5,176,518 1/1993 Mordijk et al. ... 434/37" should read --5,176,518 1/1993 Hordijk et al. ... 434/37--.

Column 1 Line 32 before "SUMMARY OF THE INVENTION" delete "BACKGROUND OF THE INVENTION".

Column 2 Line 44 after "situation" insert --discussed above--.

Claim 1 Line 26 Column 6 after "at least" insert --partly--.

Signed and Sealed this

First Day of November, 1994

Attest:

BRUCE LEHMAN

Attesting Officer

Commissioner of Patents and Trademarks